Jan. 20, 1970  R. E. HENRY ET AL  3,490,774
PACKING FOR A RECIPROCABLE PLUNGER ROD
Filed March 29, 1966  3 Sheets-Sheet 1

INVENTORS
Ralph E. Henry
John A. Marino
BY
Popp and Sommer
ATTORNEYS

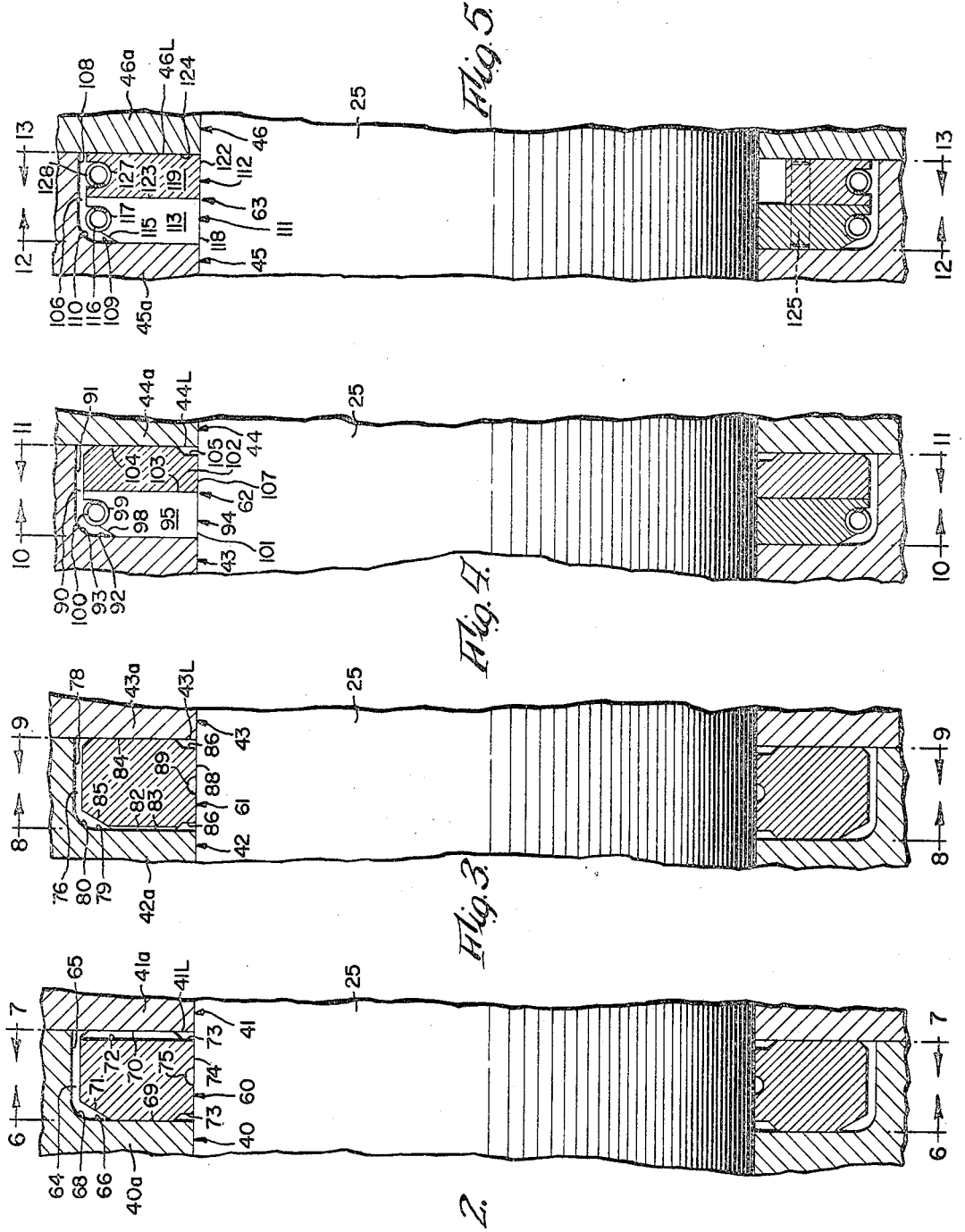

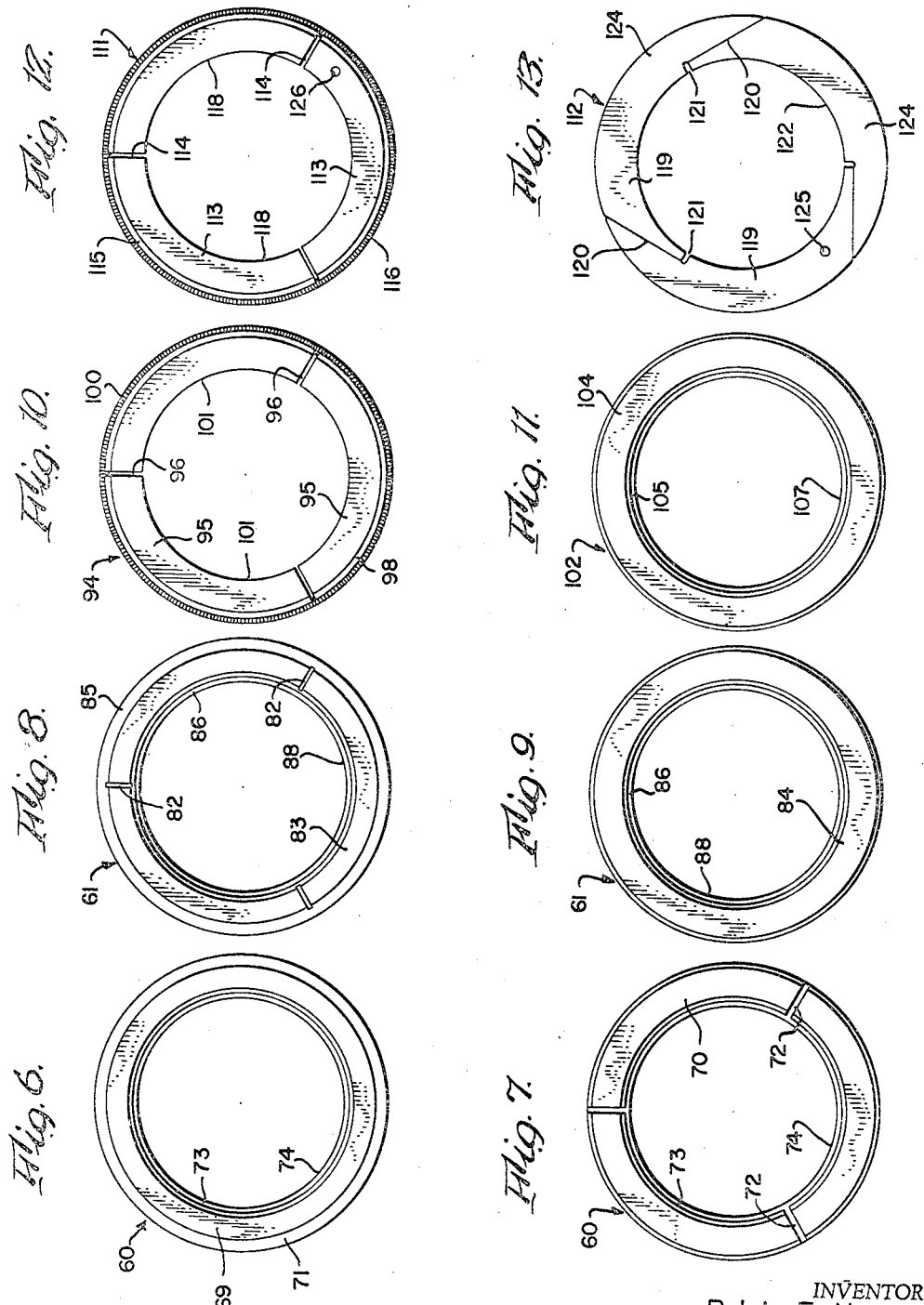

United States Patent Office 3,490,774
Patented Jan. 20, 1970

3,490,774
PACKING FOR A RECIPROCAL PLUNGER ROD
Ralph E. Henry, Rixford, Pa., and John A. Marino, Olean, N.Y., assignors to Dresser Industries, Inc., Dallas, Tex., a corporation of Delaware
Filed Mar. 29, 1966, Ser. No. 544,343
Int. Cl. F16j 15/56, 15/16
U.S. Cl. 277—58  8 Claims

ABSTRACT OF THE DISCLOSURE

A packing for the plunger rod of a high pressure pump includes eight stacked packing cups each having a bore slightly larger than that of the plunger and defining eight annular flat-sided packing cavities. Solid seal rings are provided in the two packing cavities nearest the head end of the plunger, these solid rings being arranged to be subject to the high pressure fluid to reduce the diameter thereof whereby these rings are urged into sealing engagement with the plunger. The ring nearest the head end may be a check seal ring to seal against flow toward the head end. The two packing cavities next adjacent the head end include seal assemblies consisting of an above-described solid seal ring subject to fluid pressure and a segmental type seal ring with radial joints. The four packing cavities adjacent the crank end includes seal assemblies which are a combination of a segmental seal ring with radial joints and a segmental seal ring with tangential joints. This packing is particularly effective for very high pressures.

---

This invention relates to high pressure compressors or pumps of the reciprocating type, and more particularly to a packing for the reciprocable plunger rod of such apparatus.

As compressors or pumps of the reciprocating type are being called upon to compress fluids to ever higher pressure levels, say from 35,000 pounds per square inch (p.s.i.) and up, the problem of effectively sealing against the escape of fluid from the cylinder chamber along the plunger rod becomes ever more acute. Not only must the packing surrounding the plunger rod effectively seal against the escape of fluid but must also have a reasonable longevity in order to minimize the down time of the apparatus and the intervals thereof for repair and possible replacement of elements of the packing so as to maintain the sealing effectiveness desired.

In a packing for a reciprocable plunger rod in such apparatus, it is known to provide conventional seal assemblies severally comprising pairs of segmental rings at axially spaced intervals along the plunger rod but it has been found that, due to the cyclic change in the direction of pressure differential on opposite sides of a given seal ring assembly occasioned by reciprocation of the rod during its compression and suction strokes, while such assemblies would be reasonably effective for sealing against the escape of fluid along the rod in a direction from the head end to the crank end thereof as occurs during the compression stroke such assembly would not survive for any reasonable length of time in the environment which obtains when the pressure differential acted in the opposite direction, i.e. from the crank end to the head end as occurs during the suction stroke of the plunger rod.

The primary object of the present invention, therefore, is to provide a packing for a reciprocable plunger rod of a high pressure compressor or pump which packing provides sealing effectiveness and possesses reasonable longevity.

Another important object is to provide such a packing which is capable of withstanding the cyclic changes in the direction of pressure differential acting thereon due to reciprocation of the plunger rod during its compression and suction strokes.

A further object is to provide such a packing which reduces the amount of lubricant carried forward into the compression chamber and thus reducing contamination of the fluid therein during the compression stroke of the plunger rod.

Other objects and advantages of the invention will be apparent from the following detailed description of a preferred embodiment illustrated in the accompanying drawings in which:

FIGS. 2–5 are severally fragmentary enlarged sectional views of the four types of seal ring devices forming elements of the packing illustrated in FIG. 1.

Figure 1:
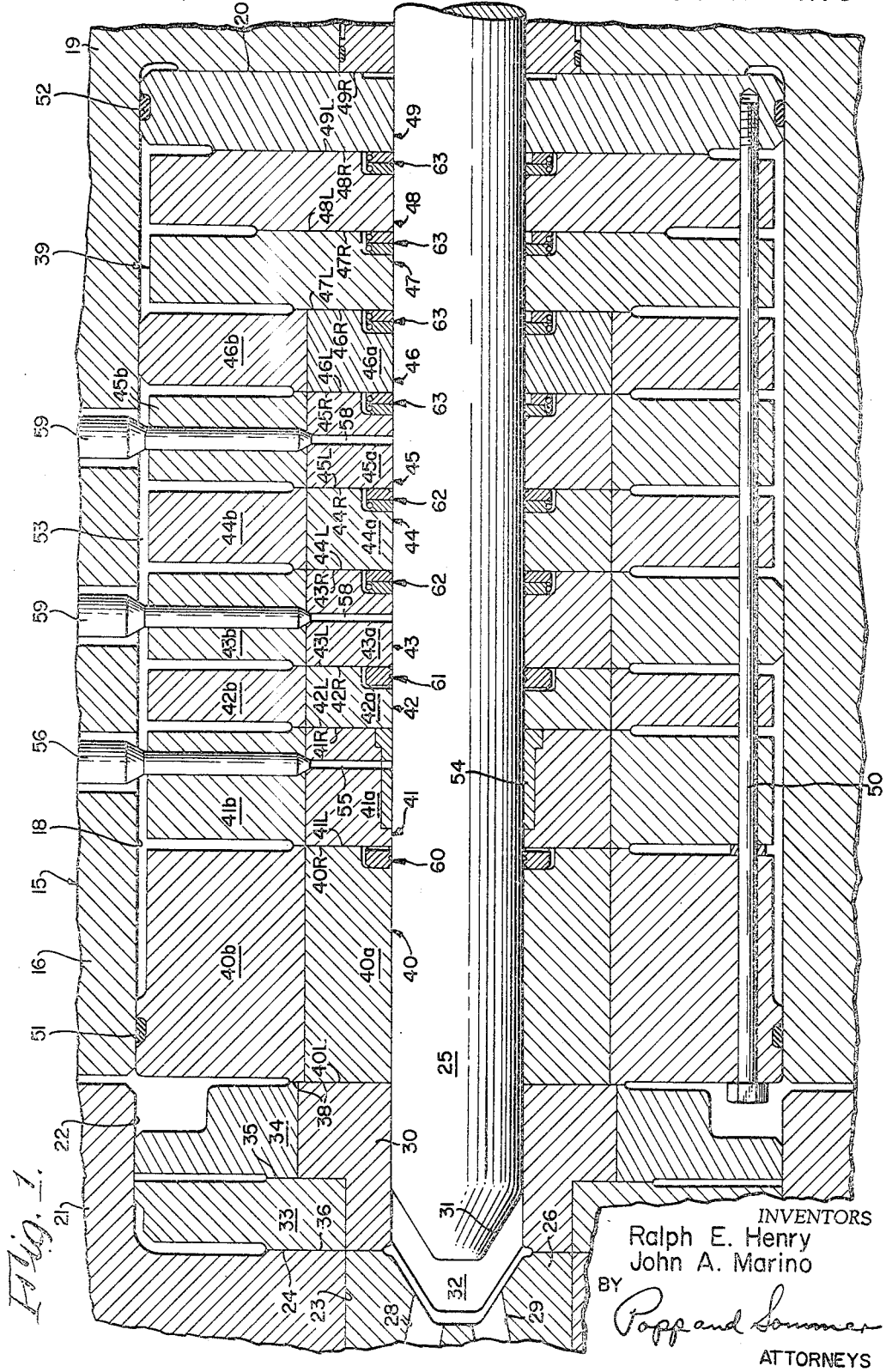
FIG. 1 is a fragmentary vertical central sectional view longitudinally through a cylinder of a high pressure compressor or pump in which a reciprocable plunger rod is operative and showing a packing having a preferred embodiment of the present invention housed within the cylinder and surrounding the plunger rod.

FIGS. 6 and 7 are end views of the seal ring device shown in FIG. 2, these views being taken on lines 6—6 and 7—7, respectively, of FIG. 2.

FIGS. 8 and 9 are end views of the seal ring device shown in FIG. 3, these views being taken on lines 8—8 and 9—9, respectively, of FIG. 3.

FIGS. 10 and 11 are end views of the seal ring device shown in FIG. 4, these views being taken on lines 10—10 and 11—11, respectively, of FIG. 4.

FIGS. 12 and 13 are end views of the seal ring device shown in FIG. 5, these views being taken on lines 12—12 and 13—13, respectively, of FIG. 5.

Referring to FIG. 1, the numeral 15 represents a cylinder body of a cylinder of a high pressure compressor or pump including an annular wall portion 16 having a cylindrical bore surface 18, and an integral end wall 19 having an inner axially facing radially extending annular surface 20. The end of the cylinder body 16 opposite from its end wall 19 is closed by a cylinder head body 21 having a cylindrical bore surface 22 of substantially the same diameter as for the bore surface 18. The cylinder head body 21 also has a bore 23 of smaller diameter than bore 22, an axially facing radially extending annular surface 24 being provided between these bores 22 and 23.

The numeral 25 represents a cylindrical plunger arranged partially within the cylinder body and head members 16 and 21, respectively, and concentric therewith, and is reciprocated during its compression and suction strokes by crank means, not shown since such means form no part of the present invention. The compression stroke of the plunger is from right to left, and its suction stroke is from left to right, as viewed in FIG. 1.

Bore 23 of cylinder head body member 21 is shown as occupied by valve body member 26 suitably retained therein and having suction and discharge passages 28 and 29, respectively. Adjacent valve body member 26 is shown a cylindrical liner member 30 which surrounds the head end of plunger rod 25. This liner member 30 jointly with valve body member 26 and the head end 31 of plunger rod 25 provides a compression chamber 32. Liner member 30 is also shown as surrounded by annular spacers 33 and 34, these spacers having radial surface portions indicated at 35 abutting each other. The outer or left radial end face 36 of spacer 33 abuts surface 24, and the outer or right end face of spacer 35 and the adjacent radial end face of liner member 30 are coplanar as indicated at 38.

Between surfaces 20 and 38 is arranged the packing embodying the present invention, the numeral 39 representing this packing assembly generally. Packing 39 is shown as including a plurality of packing cups, there being ten such cups shown in the embodiment illustrated which are designated by the numerals 40, 41, 42, 43, 44, 45, 46, 47, 48 and 49, reading from left to right as viewed in FIG. 1. Each of the packing cups 40–46 is shown as comprising an inner ring onto which an outer ring is shrunk, the respective inner rings being represented by the suffix "a" after the corresponding packing cup number and the corresponding outer ring being represented by the suffix "b" after the corresponding packing cup number. Each of the packing cups 40–49 has axially facing radially extending annular surfaces on opposite sides thereof, the left or head end surface being designated by the suffix "L" after the corresponding packing cup number and the right or crank end surface being represented by the suffix "R" after the corresponding packing cup number, as viewed in FIG. 1. The various internal packing surfaces contact one another, such as 41R and 40L, 42R and 43L, 43R and 44L, 44R and 45L, 45R and 46L, 46R and 47L, 47R and 48L, and 48R and 49L. The outer end face 40L at the left or head end of the packing 39 abuttingly engages surface 38. The outer end face 49R at the right or crank end of the packing abuttingly engages surface 20.

The various packing cups 40–49 are held together to provide a unitary structure by a plurality of circumferentially spaced axially extending tie bolts, one of which is shown at 50 in FIG. 1, the threaded ends of these bolts screwing into recesses provided in righthand packing cup 49. These tie bolts 50 enable packing 39 to be handled as a unit when placing the packing within cylinder body member 16. Left outer ring 40b of packing cup 40 is shown as carrying an O-ring 51 which sealingly engages bore surface 18. Right packing cup 49 is also shown as carrying an O-ring 52 which sealingly engages bore surface 18. The intermediate packing cups 41–48 are provided with flats on their peripheries in order to provide a chamber 53 surrounding the packing through which coolant can be circulated, the inlet and outlet for such coolant not being illustrated since this forms no part of the present invention.

During its reciprocation plunger rod 25 is slidingly supported on a guide sleeve 54 which is carried by packing cup 41. The internal surface of this sleeve 54 receives lubricant through a radial passage 55 communicating with a lubrication quill 56. Each of packing cups 43 and 45 is shown as having a radial passage 58 associated with a lubrication quill 59 so that additional lubricant can be fed toward the peripheral surface of plunger rod 25 at axially spaced locations.

There is shown associated with packing cup 40 a solid seal ring 60 and another solid seal ring 61 is associated with packing cup 42. Each of packing cups 43 and 44 is shown as having associated therewith a seal assembly 62. Each of packing cups 45–48 is shown as having associated therewith a seal assembly 63 of different type from seal assembly 62.

Referring to FIG. 2, inner ring 40a of packing cup 40 is provided with a radially flat-sided annular packing cavity 64. This cavity is provided by a cylindrical surface 65 and a radial surface 66, both formed on inner ring 40a, the juncture between these surfaces being concavely rounded to provide a fillet indicated at 68. The other or crank end side of packing cavity 64 is covered by the radial surface 41L of inner ring 41a of packing cup 41.

Solid seal ring 60 arranged in packing cavity 64 has parallel, flat and radially extending side surfaces 69 and 70, surface 69 being adapted to sealingly engage surface 66 and ring surface 70 being adapted to engage surface 41L. The outer corner of ring 60 adjacent fillet 68 is bevelled as indicated at 71. This assures lack of interference or contact between seal ring 60 and the wall surface forming cavity 64.

Ring surface 70 is shown as provided with a plurality of throttling grooves 72 which establish communication between the inner and outer peripheries of ring 60, three such grooves being shown in FIG. 7 and each extending radially with respect to the ring. In order to insure that pressure can work against ring surfaces 69 and 70, the inner corner on each side of ring 60 is shown as being undercut, as indicated at 73. Of course, the ring 60 has a cylindrical bore surface 74, interrupted by an annular groove 75, this surface normally having a relatively close clearance with respect to the peripheral surface of plunger rod 25.

Referring to FIG. 3, inner ring 42a of packing cup 42 as shown is provided with a radially flat-sided packing cavity 76 comprising a cylindrical surface 78 and a radial surface 79 formed on inner ring 42a, the junction between these surfaces being concavely rounded to provide a fillet 80. The right or crank end of packing cavity 76 is covered by surface 43L of inner ring 43a of packing cup 43. Arranged in such cavity 76 is the solid seal ring 61 which is similar in construction to seal ring 60 except that the radial grooves 82 are provided on the left or head end side of packing ring 61, such grooves being indicated at 82 and three such grooves are provided in ring 61 as shown in FIG. 8. Grooves 82 are smaller in cross sectional area than grooves 72. Otherwise, ring 61 has a head end flat side 83, and an opposite crank end flat side 84, a bevelled corner 85 adjacent fillet 80, an undercut 86 at each corner, and a cylindrical bore surface 88 relieved centrally by an annular groove 89.

Referring to FIG. 4, there is depicted therein a seal assembly 62 shown associated with packing cup 43 and arranged in its radially flat-sided cavity 90 provided by a cylindrical surface 91 and a radial surface 92 joined by a concavely rounded corner or fillet 93. The crank end side of cavity 90 is defined by surface 44L of inner ring 44a of packing cup 44.

The ensuing description of seal assembly 62 illustrated in FIG. 4 is applicable to the other such assembly bearing this number and associated with packing cup 44 as illustrated in FIG. 1. Referring to FIG. 4 seal assembly 62 is shown as comprising a radially flat-sided segmental ring 94 having segments 95, three being shown in FIG. 10, separated by radial joints 96. The outer corner of segmental ring 94 adjacent fillet 93 is shown as bevelled as indicated at 98. Also, the outer periphery of segmental ring 94 has an annular groove 99 in which a garter spring 100 is arranged, this spring being specifically shown as end-to-end connected helically wound tension spring that embraces the segments 95 and constantly urges them to a contracted condition so that the inner surface 101 of each segment 95, which surfaces collectively are generally cylindrical, are urged into sealing contact with the periphery of plunger rod 25. The radial joints 96 have clearance when internal surfaces 101 of segmental ring 94 are engaging plunger rod 25.

Seal assembly 62 also includes a radially flat-sided solid seal ring 102 arranged on the crank end side of segmental ring 94. Rings 94 and 102 contact each other along their opposing sides as indicated at 103. The outer axially facing side 104 of solid ring 102 is adapted to sealingly engage surface 44L. The inner corner on the crank end side of solid ring 102 is shown as being undercut, as indicated at 105. Ring 102 has an uninterrupted cylindrical bore surface 107 normally having a relatively close clearance with respect to the peripheral surface of plunger rod 25.

Referring to FIG. 5, the other type seal assembly 63 is shown associated with packing cup 45, and it is to be understood that the ensuing description of this seal assembly will be equally applicable to each of the three other similar seal assemblies bearing this number as shown in FIG. 1. Referring again to FIG. 5, seal assembly 63 is shown as arranged in a radially flat-sided packing cavity 106 comprised of a cylindrical surface 108 and a radial surface 109, these surfaces being formed on inner ring 45a of packing cup 45 and the juncture between these surfaces being concavely rounded to form fillet 110. The crank end side of cavity 106 is defined by radial surface 46L of inner ring 46a of packing cup 46. Seal assembly 63 comprises a segmental ring 111 arranged in cavity 106 adjacent the head end side thereof, and another segmental ring 112 arranged in this cavity adjacent the crank end side thereof.

Segmental ring 111 is radially flat-sided and has segments 113 separated by radial joints 114, three such segments being shown in FIG. 12. The outer corner of segmental ring 111 adjacent fillet 110 is bevelled as indicated at 115. The outer periphery of this segmental ring 111 is provided with an annular groove 117 in which a garter spring 116 is arranged. Spring 116 is shown as being in the form of an endless helically wound spring and is intended to contract segments 113 inwardly so that their inner surfaces 118 are urged into sealing engagement with the periphery of rod 25. When surfaces 118 so contact rod 25 there is clearance between the butt ends of segments 113 defining joints 114.

Segmental ring 112 is radially flat-sided and comprises a plurality of segments 119, three such segments being shown in FIG. 13. The adjacent ends of adjacent segments 119 are provided with overlapping flat and contacting surfaces slidable one on the other to provide a generally tangentially extending joint 120. At the inner ends of these joints there is a slight clearance indicated at 121 at all times between opposing radial end surfaces of these adjacent segments, such clearance allowing the sliding contact of the segments 119 one relative the other which define such a joint 120.

Segmental ring 112 is shown as having an annular groove 127 in which a garter spring 128 is arranged, this spring being like the other springs an endless helically wound coil in tension so as to urge segments 119 to slide on one another whereby the inner bore surface 122 of each segment of ring 112 is compressed against the peripheral surface of plunger rod 25. The inner and opposing surfaces of segmental rings 111 and 112 are in contact as indicated at 123. The outer axially facing surface 124 of segmental ring 112 on the crank end side thereof is adapted to sealingly engage surface 46L.

Segmental rings 111 and 112 are oriented circumferentially with respect to each other so that their opposing and contacting sides have an uninterrupted surface portion on one which covers the edge of each of the joints 114 or 120, 121 provided in the other of such sides. This orientation is maintained by a pin and recess connection between the rings, the pin 125 being shown as carried by one of the segments 119 and receivable in a hole 126 provided in one of the segments 113.

It will be appreciated that when plunger rod 25 moves leftwardly during its compression stroke the gaseous fluid in chamber 32 is compressed to a high pressure level of say at least 35,000 p.s.i. at which the fluid will be discharged through passage 29. At such pressure level the fluid tends to leak along the periphery of plunger 25 toward and through packing 39, which leakage occurring primarily through the slight clearance which exists between the opposing peripheral surfaces of packing cups 40–48 and the plunger rod.

One function of solid seal ring 60 is to allow a controlled leakage of fluid past this ring toward the other seal ring devices. Thus, fluid will flow through the slight clearance between ring surface 74 and the rod 25, through a slight clearance which will exist between ring surface 69 and cavity radial surface 66, through the clearance between the periphery of ring 60 and cavity cylindrical surface 65, and through grooves 72 which tend to throttle to a limited degree the flow of fluid, and effecting a limited pressure drop.

The fluid passed by seal ring 60 next encounters seal ring 61. Some of this fluid immediately flows through the radial clearance between the surfaces of ring 61 and rod 25. Other fluid flowing through grooves 82 urges seal ring 61 so that its surface 84 is pressed firmly against surface 43L. At the same time this pressurized fluid in cavity 76 bears against the periphery of seal ring 61. Such immersion in this high pressure fluid subjects ring 61 to tri-axial compression resulting in a reduction in the diameter of this ring which is directly proportional to the pressure within the elastic limits of the material of such ring. The forces on this ring 61 are therefore axially, radially and circumferentially directed and hence the compression is termed tri-axial.

By placing such a solid ring in a seal cavity surrounding a plunger rod in a high pressure environment with controlled installation clearances, pressure application shrinks the ring into engagement, or very nearly so, with the plunger rod to effect a pressure drop across the ring and pull it into firm engagement with the plunger rod to effect a seal. When such a solid ring is shrunk or forced into engagement with the plunger rod, friction heating of the ring results which causes the ring to expand and reduces the intensity with which it had been bearing on the plunger rod. Consequently, such a solid ring has the inherent ability to adjust bearing pressure with the plunger rod.

How the solid seal ring acts depends on the modulus of elacticity of the ring material, Poisson's ratio, the pressure level to which the ring is subjected, and the thermal expansivity of the ring material.

Adverting again to FIG. 1, it will be seen that the leaking fluid passed by solid seal ring 61 next encounters the first combination seal assembly 62 in packing cup 43. The pressure of such fluid is at a somewhat lower level but still high enough to cause solid seal ring 102 (FIG. 4), to be subjected to tri-axial compression and producing a reduction in the diameter of such ring whereby its internal cylindrical bore surface 107 is brought into self-adjusting sealing engagement with the peripheral surface of plunger rod 25. At the same time the radial surface 104 of this solid ring 102 sealingly engages surface 44L. Before solid ring can be so tri-axially compressed the segmental ring 94 is contracted into film sealing engagement between its bore surface 101 and the periphery of plunger rod 25 by the pressure of fluid which obtains in packing cavity 90, such pressure amplifying the loading of garter spring 100 on this segmental ring 94. Such contraction of segmental ring 94 blocks off the upstream end of the installation clearance which existed originally between the opposing surfaces of solid ring 102 and rod 25. A combination ring assembly 62 is required because the upstream seal devices 60 and 61 will have reduced the pressure level and pressure differential so that a solid ring alone could not actuate or function as described hereinabove. Consequently, the additional segmental ring 94 in conjunction with solid ring 102 reduces the leakage area and increases the pressure drop across this solid ring to cause it to be actuated into sealing and functioning as previously explained herein.

Accordingly, each of the two combination seal assemblies 62 illustrated in FIG. 1 includes a solid ring subject to tri-axial compression to produce radial sealing and the flat side of such solid ring is also utilized on the crank end side of the packing cavity to produce axial sealing. The radial sealing is supplemented by the action of the companion segmental ring 94. The continuous inside surface of solid ring 102 closes or covers the radial joints 96 in segmental ring 94.

It will be appreciated that the seal assembly 62 in packing cup 43 produces a further pressure drop in fluid leaking along plunger rod 25 toward its crank end, and that the similar seal assembly 62 in packing cup 44 produces a still further pressure drop in the same direction. However, the pressure environments in which both seal assemblies 62 operate are still high enough to subject the respective solid seal ring 102 to tri-axial compression, although the pressure level for seal assembly in packing cup 44 is lower than that for seal assembly 62 in packing cup 43.

Still referring to FIG. 1, the fluid leaking past the last of the seal assemblies 62 encounters the first of the other type of seal assembly 63, the same being arranged in packing cup 45. This first seal assembly 63 produces more effective sealing, as do the other similar assemblies 63 successively toward the crank end of the packing 39, until the last or extreme rightward seal assembly 63 is substantially fully effective to prevent all leakage along plunger rod 25.

Each of seal assemblies 63 operates so as to utilize the pressure obtaining in the corresponding packing cavity 106 to contract both segmental rings 111 and 112 in such cavity into firm sealing engagement with the periphery of plunger rod 25. At the same time the crank end side of segmental ring 112 is pressed into sealing engagement with surface 46L so that the outer edges of tangential joints 120 in this segmental ring 112 are covered by this surface. The inner edges of these tangential joints 120 on the head end side of segmental ring 112 are covered by the uninterrupted surface portions of segmental ring 111. As well, the inner edges of radial slots 114 in segmental ring 111 are severally covered or closed by the uninterrupted surface portions of the segments in ring 112.

Employing a number of solid seal rings with their inherent characteristics of lower intensity bearing on the plunger rod and the fact that each ring passes or leaks a small portion of fluid before effective sealing is accomplished results in distributing the pressure differential over a number of rings to improve seal ring life.

In this manner, the high pressure obtaining in compression chamber 32 during the compression stroke of pressure rod 25 is stepped down by the various ring devices 60–63. As a consequence it will be seen that between such seal ring devices will be left pockets of pressurized fluid such that when plunger rod movement reverses to begin the suction stroke, the pressure in chamber 32 is lowered to a level below that which obtains in the pockets between some of the various seal ring devices 60–63. This tends to produce a back flow of fluid toward chamber 32. If this back flow were allowed to occur too rapidly, the extreme pressure differential on some of the segmental rings such as the segmental rings 94 of the seal assemblies 62 will cause them to enlarge explosively since the pressure could enter the spaces in the joints 96 and this tendency toward expansion works in opposition to the urging of garter spring 100. This would fatigue the retainer springs and break the ring segments. Broken retainer springs could then manage to come into contact with the plunger rod causing very detrimental galling and spalling of its surface. This is avoided in accordance with the present invention by controlling the back flow of fluid toward chamber 32.

This control is supplied in part by the grooves 82 in single acting solid ring 61 whereby the fluid flow around this ring through cavity 76 is caused to flow through these grooves. Principally, the back flow of fluid is controlled by the action of ring 60 which acts as a check ring. During such back flow of fluid the pressure is higher on the right side of ring 60 than on the left side, as viewed in FIG. 1, so that the left side or head end side 69 of ring 60 is pressed into sealing engagement with cavity radial wall 66. Leakage in the radial clearance between ring surface 74 and the plunger rod reduces the explosive back flow to a gentle let down process.

Any packing arrangement employing a solid seal ring must operate at a pressure level sufficiently high to produce tri-axial compression of the solid ring. Above such threshold level, the minimum combination of seal ring devices would be one solid ring device either of the check ring type represented by ring 60 or the single acting type represented by ring 61, and a two segmental ring device of the type represented by assembly 63. For effectiveness at a higher pressure level, the minimum combination would include one solid ring of either type 60 or 61, one combination ring of type 62 and one double segmental ring of type 63. For effectiveness at still higher pressure levels, two solid rings should be employed, one of the check ring type 60 and the other of the single acting type 61, at least one combination ring assembly of the type 62, and at least one double segmental ring assembly of the type 63.

The packing arrangement shown in the drawings for illustration of a very high pressure application of the invention employs two solid rings, one of each type, two combination rings and four dual segmental ring assemblies.

Use of a solid ring permits lower bearing pressures on the plunger rod which results in longer seal life. While these lower bearing pressures result in lower effective sealing this is beneficial in that it distributes the sealing differential of a number of seal devices in the packing to increase further the life of the seal package as a whole. A solid seal ring offers structural advantages in that it does not break as readily as a segmental ring and is not adversely affective by reverse pressure differentials as occurs with segmental seal rings.

Seal ring devices of the three types disclosed, 60 or 61, 62 and 63 have been used in various combinations depending upon the pressure level being sealed against and have met with considerable commercial success both as to effectiveness of seal and longevity of the packing as a whole.

From the foregoing, it will be seen that the embodiment shown and described achieves the various objects stated. Inasmuch as changes and modifications may suggest themselves to those skilled in the art without departing from the spirit of the present invention, the packing and associated apparatus as shown and described is illustrative and not limitative of the present invention the scope of which is to be measured by the appended claims.

What is claimed is:

1. In a packing for a reciprocable plunger rod having a head end and a crank end, the combination comprising
means providing a plurality of radially flat-sided packing cavities spaced apart longitudinally of said rod and severally surrounding the same;
a solid seal ring in one of said cavities;
a seal assembly in another of said cavities on the crank end side of said solid seal ring; said seal assembly including a first flat-sided segmental ring having segments separated by generally radially extending joints, a second flat-sided segmental ring on the crank end side of said first segmental ring and having segments which contact one another along generally tangentially extending joints; said segmental rings contacting each other along their adjacent flat sides, one of which has an uninterrupted surface portion covering the edge of each of said joints in the other; and a garter spring surrounding each of said segmental rings;
said solid ring being subjected to tri-axial compression when immersed in a high pressure fluid, producing a reduction in the diameter thereof whereby it sealingly engages the plunger rod.

2. In a packing for a reciprocable plunger rod having a head end and a crank end, the combination comprising
means providing a plurality of radially flat-sided packing cavities spaced apart longitudinally of said rod and severally surrounding the same;
a first solid seal ring in one of said cavities;
a first seal assembly in another of said cavities on the crank end side of said first solid ring; said first seal assembly including a first flat-sided segmental ring having segments separated by generally radially extending joints, a first garter spring surrounding said first segmental ring, and a second flat sided solid ring on the crank end side of said first segmental ring; said first segmental ring and said second solid ring contacting each other along their adjacent flat sides;

and each of said solid rings being subjected to tri-axial compression when immersed in a high pressure fluid, producing a reduction in the diameter thereof whereby it sealingly engages the plunger rod.

3. A packing as set forth in claim 2 including
a second seal assembly in still another of said cavities on the crank end side of said first seal assembly; said second seal assembly including a second flat-sided segmental ring having segments separated by generally radially extending joints, a third flat-sided segmental ring on the crank end side of said second segmental ring and having segments contacting one another along generally tangentially extending joints, said second and third segmental rings contacting each other along their adjacent flat sides, one of which has an uninterrupted surface portion covering the edge of each of said joints in the other, and a garter spring surrounding each of said second and third segmental rings.

4. A packing as set forth in claim 3 including a solid check ring in another of said cavities on the head end side of said first solid seal ring; both said check ring and said first solid seal ring having grooves on their respective proximate faces which establish communication between the inner and outer peripheries of the rings.

5. A packing as set forth in claim 4 wherein the cross sectional area of said grooves in said first solid seal ring is smaller than that of the grooves in said check ring to provide a greater throttling effect on fluid flowing therethrough.

6. A packing as set forth in claim 4 including
a plurality of said second seal assemblies in adjacent other cavities on the crank end side of said first seal assembly.

7. A packing as set forth in claim 1 including
a solid check ring in one of said cavities on the head end of said solid seal ring; both said check ring and said solid seal ring having grooves on their respective proximate faces which establish communication between the inner and outer peripheries of the rings.

8. A packing as set forth in claim 2 including
a solid check ring in one of said cavities on the head end side of said first solid seal ring; both of said check ring and said first solid seal ring having grooves on their respective proximate faces which establish communication between the inner and outer peripheries of the rings.

References Cited

UNITED STATES PATENTS

| | | | |
|---|---|---|---|
| 726,953 | 2/1902 | Lentz | 277—75 |
| 849,115 | 4/1907 | France | 277—75 |
| 3,194,568 | 7/1965 | Payne | 277—68 |
| 3,305,241 | 2/1967 | Hart | 277—27 |
| 3,271,037 | 9/1966 | Hammond | 277—27 |

FOREIGN PATENTS 261,118  11/1926  Great Britain.

SAMUEL ROTHBERG, Primary Examiner

U.S. Cl. X.R.

277—71, 154